United States Patent [19]
Atkin et al.
[11] 3,987,530
[45] Oct. 26, 1976

[54] HEAT FUSER ROLL AND METHOD OF MANUFACTURE

[75] Inventors: Robert B. Atkin; Frederick C. Tarmann; John H. Wong, all of San Jose, Calif.

[73] Assignee: International Business Machines Corporation, Armonk, N.Y.

[22] Filed: Apr. 11, 1975

[21] Appl. No.: 567,153

[52] U.S. Cl. .................... 29/132; 427/350; 427/374 R; 427/377; 427/379; 427/387; 428/447

[51] Int. Cl.$^2$ .................... B05D 3/02; B32B 25/20

[58] Field of Search .......... 427/377, 387, 350, 374, 427/379; 29/132

[56] References Cited

UNITED STATES PATENTS

| | | | |
|---|---|---|---|
| 2,460,795 | 2/1949 | Warrick | 260/46.5 G |
| 2,601,337 | 6/1952 | Smith-Johannsen | 427/387 |
| 2,891,879 | 6/1959 | Rohrer | 427/377 |
| 3,101,277 | 8/1963 | Eden et al. | 427/387 |
| 3,202,542 | 8/1965 | Poje | 427/387 |
| 3,268,359 | 8/1966 | Boyd et al. | 427/387 |
| 3,455,732 | 7/1969 | Hathaway | 427/387 |
| 3,669,707 | 6/1972 | Donnelly et al. | 427/194 |
| 3,848,305 | 11/1974 | Jachimiak | 29/132 |

*Primary Examiner*—William H. Schmidt
*Attorney, Agent, or Firm*—Otto Schmid, Jr.

[57] ABSTRACT

A heat fuser roll and the method of manufacture thereof. The roll comprises a deformable layer on a base member and the deformable layer is produced by coating the base member with a silicone gum material containing no curing agent and treating the coated base member by heating in an inert atmosphere to a temperature at which substantial cross-linking occurs for a predetermined time to produce a tough long-wearing silicone rubber deformable layer.

12 Claims, 2 Drawing Figures

HEAT FUSER ROLL AND METHOD OF MANUFACTURE

BACKGROUND OF THE INVENTION

This invention relates to improvements in heat fusing apparatus and more particularly to heat fusing apparatus in which a heated element is brought into contact with an image formed of a resinous powder to heat the powder and fix the powder image to a sheet of paper.

Contact fusing apparatus is known in the prior art. However, contact fusing has the disadvantage that "offset" may occur. Offset is caused by part of the image sticking to the surface of the contact fusing device so that when the next sheet comes into contact with the fusing device the image partially removed from the first sheet is transferred to the second sheet. This offset problem has been overcome in commercial machines by fabricating the outer surface of the heated roll with a material such as Teflon. However, this apparatus requires that the heated roll be continuously coated with an offset preventing liquid such as silicone oil during operation. There has been developed a heated roll coated with a resilient material such as silicone rubber which when operated with a deformable backup roll will produce offset-free operation over a particular range of temperature and pressure without the use of an offset preventing liquid such a silicone oil. Such a system is described in U. S. Pat. No. 3,666,247 issued May 30, 1972, and assigned to the same assignee as this application. This apparatus successfully solved the offset problem without using silicone oil. However, the resultant coating on the fusing roll disclosed therein has not had sufficient useful life so that it is suitable for use in a system which utilizes high process speeds in which the components of the system are required to have maintenance-free operation for a long period of time. Other silicone rubbers with properties which would indicate a longer useful life in the fuser environment were tried using prior art curing techniques. While some improvement was achieved, the useful life remained well below that required. The conventional prior art curing process for silicone rubbers involves the use of a curing agent such as certain of the peroxides and it was discovered that the curing agent produces several undesirable side effects in thin sections of silicone rubber so that these rubbers have both reduced and variable lives in the fusing environment.

SUMMARY OF INVENTION

It is therefore the principal object of this invention to produce a fuser apparatus which is capable of fusing images without offset at a high process speed and which produces maintenance-free operation for long periods of time.

It is a further object of this invention to provide an improved method for manufacturing a fuser roll having improved properties.

Briefly, according to the invention, apparatus and a method is provided for manufacturing an improved fuser roll wherein the roll is coated with a rubber solution which contains no curing agent. The coating is dried and then treated by heating to a temperature at which substantial cross-linking occurs in an inert atmosphere for a predetermined time to produce a tough long-wearing silicone rubber surface.

DESCRIPTION OF THE PREFERRED EMBODIMENT

Figure 1:
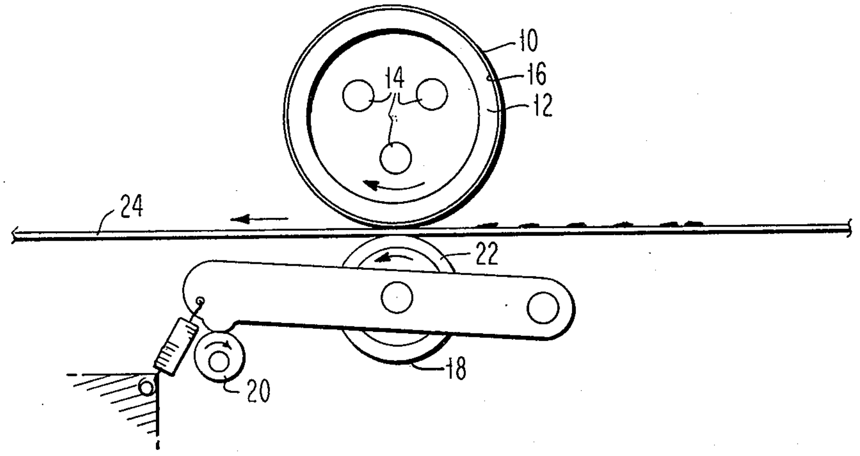
FIG. 1 shows a roll embodiment of the fusing apparatus embodying the present invention.

Although the invention is considered to have general application, it is particularly useful in the field of electrophotography and has an important application in the fusing of resinous powder images produced by electrophotography onto sheets of paper. Therefore, for convenience of illustration, the invention is shown in FIG. 1 and will be described below with reference to its use as a heat fuser for electrophotographic images. However, it will be understood that the invention may be employed with equal facility in other fields which require tough thin sections of silicone rubber.

In the embodiment shown in FIG. 1, the fusing apparatus comprises a heated member 10 in the shape of a roller which comprises a heat conducting base member 12 having infrared lamps 14 disposed therein and having a deformable layer 16 of an insulating high temperature material such as one comprising silicone rubber on its outer surface. The power to the lamps 14 will vary depending upon the speed of the paper web 24 through the fusing station and the desired temperature for the hot roll surface temperature. The base member comprises a tube 12 made from a suitable material, such as copper or aluminum, which is a good heat conductor. However, since high temperature materials such as silicone rubber are heat insulating materials, the thickness of the deformable layer 16 must be kept thin and in a practical embodiment, this thickness would normally be 10 mils or less. The backup element 18 is also in the shape of a roller, and the roller is pushed against the heated roll with a meshing force supplied in the illustrated embodiment by cam means 20. The backup element is also formed of a high temperature elastomer 22 such as one comprising silicone rubber.

Heated roll 10 is driven by a suitable motor and when backup roll 18 is meshed with the heated roll the pressure causes paper web 24 to be driven through the hot roll fuser and to fuse and permanently fix the toner image to sheet 24. Paper web 24 may comprise roll paper, separate sheets of paper or fan-fold paper sheets. The fan-fold paper sheets produce greater wear on the deformable layer due to the presence of the tractor holes in the fan-fold paper.

According to the present invention, a method for manufacturing an improved fuser roll comprising tube 12 and deformable layer 16 is disclosed which has a greatly increased useful life. The fuser roll should have the properties at temperatures suitable for fusing toner, of release from the toner after fusing, wear resistance to fan-fold paper, especially at tractor holes, acceptable heat transfer and ability to elastically deform under load to give contact with toner during fusing. The time during which the fuser roll retains these properties is its useful life.

These properties can be obtained by the proper choice of a silicone rubber compound and the curing of this compound to form a silicone elastomer. The silicone elastomer required in the practice of our invention is formed by the curing or further polymerization of silicone gums. Silicone gums that we have found to be particularly useful in the practice of our invention are dimethyl siloxane polymer resins. The preferred gum is a 50/50 mixture of SE7501 Silicone Rubber Compound and SE33U Silicone rubber compound, both manufactured by General Electric Co. SE7501 is a silicone gum stock with 14% silica filler and SE33U is a silicone gum stock with no filler.

The silicone rubber compound is formed on tube 12 by any suitable method such as dip coating, spraying or doctor blade techniques. However, the preferred technique is to spray a solution of the compound on the roll. Both compressed air and electrostatic spraying techniques are operable, but a material such as methyl ethyl ketone must be added to the solution to make it conductive if an electrostatic spraying operation is used. To produce a suitable solution of the silicone rubber compound, a solvent must be chosen which does not leave a residue and which is compatible with the rubber compound chosen over an extended period of time so that the solution will have an adequate shelf life. For example, the solvent chosen for our preferred silicone rubber compound comprises a mixture of two solvents, one of which acts as a diluent or carrier and the other of which acts as a leveling agent. The solvent which acts as a diluent is Hexane which has a high vapor pressure. The Hexane is added to the solution in a sufficient quantity to produce a viscosity low enough that the solution can be successfully sprayed, but the Hexane evaporates rapidly from the spray due to its high vapor pressure. The solvent which acts as a leveling agent is Xylene and this solvent stays in the solution long enough for the spray droplets to coalesce on the roll surface, and this contributes to a smooth surface finish on the roll.

The roll 12 is made from a suitable material which has good heat transfer properties such as copper or aluminum. Copper rolls are nickel plated, and after cleaning are primed with a suitable primer to promote strong adhesion of the deformable layer to the roll. Dow Corning 2260 Silicone Rubber Primer is one suitable primer to use for copper rolls. Aluminum rolls are produced from a suitable alloy and are fully annealed. The roll is then treated with a chromate conversion process known as the Alodine 217 process to promote adhesion between the roll and the deformable layer.

The solution of silicone gum in an organic solvent is sprayed as the roll is turning on a spraying fixture. The coating is produced by multiple spray passes and the spraying operation may take 4 to 6 minutes, depending on the final thickness of coating desired and the viscosity of the particular solution being used. The preferred thickness for the cured coating is between 3 and 10 mils and the thickness is chosen from heat transfer, process speed, and roll temperature considerations in a specific fuser design.

Once the spraying operation is complete, the roll is allowed to dry at room temperature (75° F.) on the fixture while still turning for a period of about 15 minutes. The roll is then removed from the spray booth and placed on end in a laminar flow hood. The roll still contains a substantial amount of solvent (primarily Xylene) and this solvent will evaporate in approximately 45 minutes. The drying air is at room temperature and must be free of particulate contaminants. The minimum time required for the drying operation will depend on the solvent or solvents chosen for the silicone gum solution. However, in this process, the drying operation is not critical and, if desired, the roll may be dried overnight.

The coated roll is oven cured at a predetermined temperature for at least the minimum time required (see FIG. 2) for that cure temperature. In selecting the predetermined temperature one consideration is the annealing effect the temperature may have on the base member. If a relatively short time is chosen, then it would be necessary to monitor the base member temperature since both the oven and the substrate must be up to temperature before measuring the time shown in FIG. 2.

The curing is conducted in the oven in the presence of an inert atmosphere. An atmosphere of the noble gases such as Argon, Krypton, Helium etc. would be suitable as well as nitrogen. In addition, a vacuum of one-tenth mm of mercury would also work. The preferred inert atmosphere is a dry flowing nitrogen atmosphere. A flowing atmosphere is desirable since this carries away any material liberated during the heating operation and prevents it from re-depositing onto the roll surface.

At the end of the cure cycle, the roll should be kept in the inert atmosphere until the roll cools, preferably at least to the temperature at which the roll is to be used. The cooling in the inert atmosphere prevents oxidation damage to the cured rubber surface. In a specific process similar to Example I below, the roll is cooled to below 350° F. in the inert atmosphere, but the roll may be cooled to room temperature in the oven if desired.

EXAMPLE I

A fuser roll was constructed in accordance with our invention substantially as shown in FIG. 1 comprising a 3.5 inch diameter copper roll 15.9 inches long with a one-fourth inch wall thickness. The surface of the roll was cleaned and primed with Dow Corning 2260 Silicone Rubber Primer. The roll was spray coated with a solution comprising 50 parts each of SE7501 Silicone Rubber compound and SE33U Silicone Rubber Compound, both manufactured by General Electric Co., 300 parts Xylene, and 730 parts Hexane. The roll was air dried at room temperature for 15 minutes while rotating on the coating fixture. The roll was dried in a laminar flow hood at room temperature for about 45 minutes to evaporate residual solvents. The roll was then cured in an oven by heating in a dry flowing nitrogen atmosphere for 4 hours at a temperature of 598° F. The resultant thickness of the cured elastomer coating was about 5.8 mils.

The roll was operated substantially as shown in FIG. 1 in contact with a 2 inch diameter back-up roll having a deformable silicone elastomer surface at a nip load pressure of 12 pounds per inch of width. The fuser roll was heated to a surface temperature of 425°–450° F. and was driven at a surface speed of about 32 inches per second. The fuser roll was used to successfully fuse images on about 928,000 11½ inch long, 14⅞ inch wide fan-fold paper sheets. Other rolls were prepared by spray coating a solution comprising equal parts of SE7501 Silicone Rubber Compound and SE33U Silicone Rubber Compound, both manufactured by General Electric Co. with a 4% Luperco CST peroxide catalyst. The rolls were then oven cured. These rolls typically successfully fused images on about 400,000 11½ inch long, 14⅞ inch wide fan-fold paper sheets.

Thus it can be seen that the roll produced in Example I provides a useful life improved by more than a factor of 2. The whole coating process is also simplified because the curing agent, an inherently unstable material, is eliminated so its concentration and activity need not be measured or controlled. In addition, the drying operation is not critical and the curing time-temperature cycle is not critical.

Figure 2:
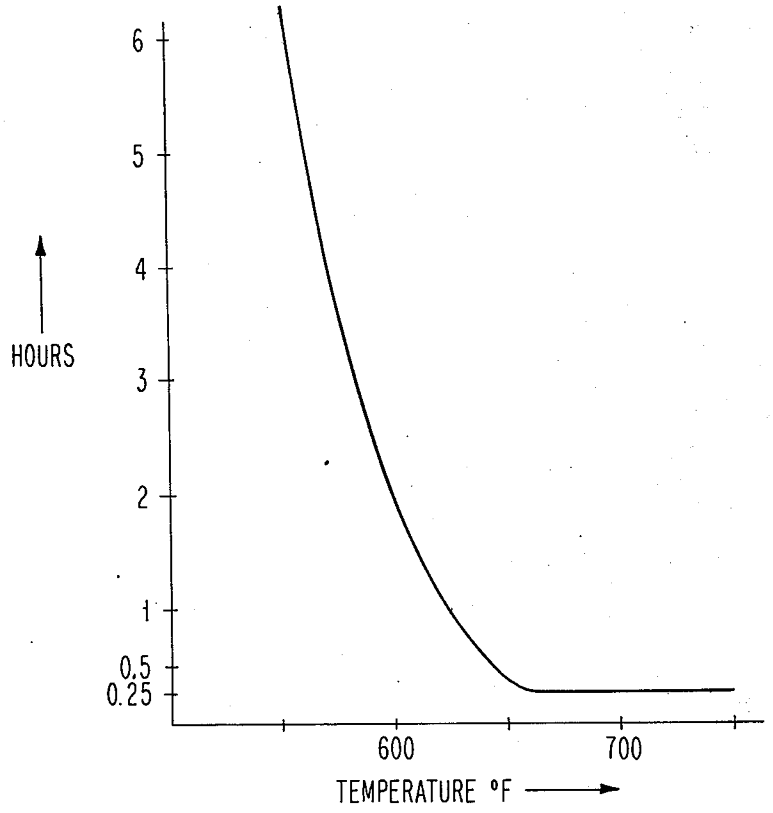
FIG. 2 is a graph which shows the relationship of time and temperature for curing a specific fuser roll material in an inert atmosphere.

Various times and temperatures required to produce a suitable cure of a fuser roll coating according to the specific materials of Example I were investigated, and these time and temperature relations are shown in FIG. 2. The area to the left and below the curve shown in FIG. 2 represents curing conditions which result in an unsatisfactory fuser roll coating. By choosing a curing temperature within the operable range of the process, the minimum time to produce a cure of the roll coating can be determined from this graph. If one chooses a 600° F. curing temperature, the minimum curing time is about 2 hours. However, if one chooses a 600° F. curing temperature and a curing time of about 3 hours, then a temperature tolerance of about −18° can be assigned. The preferred time-temperature curing cycle for the roll described in Example I is 3 hours at a temperature of about 600° F.

While the invention has been particularly shown and described with reference to a preferred embodiment thereof, it will be understood by those skilled in the art that various changes in form and details may be made therein without departing from the spirit and scope of the invention.

What is claimed is:

1. The method of manufacturing an elastic and deformable coating comprising the steps of:

forming a thin film of silicone gum material containing no curing agent on a base member, and treating said silicone gum material in an inert atmosphere by heating for a predetermined time to a temperature at which substantial cross-linking occurs to produce a tough, long-wearing elastic and deformable silicone rubber coating on said base member.

2. The method of manufacturing a contact heat fuser roll for fixing a resinous powder image to a substrate comprising the steps of:

forming a thin film of a silicone gum material containing no curing agent on a non-deformable cylindrical member, and treating said silicone gum material in an inert atmosphere by heating for a predetermined time to a temperature at which substantial cross-linking occurs to produce a tough, long-wearing silicone rubber coating on said cylindrical member.

3. The method according to claim 2 wherein said forming step comprises applying to the surface of said cylindrical member a coating of a thickness of from about 3 mils to about 10 mils.

4. The method according to claim 2 wherein said temperature in said treating step is about 600° F. and said predetermined time is three hours.

5. The method according to claim 2 wherein said inert atmosphere comprises a nitrogen atmosphere.

6. The method for manufacturing a contact heat fuser roll for fixing a resinous powder image to a substrate comprising the steps of:

coating a base member with a solution of silicone gum in an organic solvent, said solution containing no curing agent;

drying the coated base member in air for a time sufficient for substantially all of said solvent to evaporate, and curing said silicone gum by heating the coated base member to a predetermined temperature in an inert atmosphere for at least a predetermined time to produce a tough, long-wearing silicone rubber coating on said base member.

7. The method according to claim 6 wherein said coating step comprises applying to the surface of said base member a coating of a thickness of from about 3 mils to about 10 mils.

8. The method according to claim 6 wherein said predetermined temperature in said curing step is about 600° F. and said predetermined time is 3 hours.

9. The method according to claim 6 wherein said inert atmosphere comprises a nitrogen atmosphere.

10. The method according to claim 6 comprising the additional step of:

cooling the cured silicon rubber coated base member in said inert atmosphere until the temperature is below a second predetermined temperature.

11. The method according to claim 10 wherein said second predetermined temperature is about 350° F.

12. As an article of manufacture, a fuser roll prepared in accordance with the method of claim 2.

* * * * *